United States Patent [19]

Kawabata

[11] 4,409,533

[45] Oct. 11, 1983

[54] METHOD OF RESTARTING INDUCTION MOTOR AND APPARATUS FOR CARRYING OUT THE SAME

[75] Inventor: Takao Kawabata, Amagasaki, Japan

[73] Assignee: Mitsubishi Denki Kabushiki Kaisha, Tokyo, Japan

[21] Appl. No.: 55,192

[22] Filed: Jul. 2, 1979

[30] Foreign Application Priority Data

Jun. 30, 1978 [JP] Japan .................. 53-80349

[51] Int. Cl.³ .............................................. H02P 1/42
[52] U.S. Cl. .................................... 318/807; 318/440; 318/778; 307/87
[58] Field of Search .............................. 318/440–442, 318/778, 798, 807; 307/64, 66, 80, 87

[56] References Cited

U.S. PATENT DOCUMENTS

| | | | |
|---|---|---|---|
| 3,262,037 | 7/1966 | McCabe et al. | 318/441 X |
| 3,753,002 | 8/1973 | Jacobson et al. | 307/87 |
| 3,824,406 | 7/1974 | Ellis | 307/87 |
| 3,863,123 | 1/1975 | Godard et al. | 318/440 |
| 3,932,764 | 1/1976 | Corey | 307/87 X |
| 3,991,319 | 11/1976 | Servos et al. | 307/64 |
| 4,195,233 | 3/1980 | Udvardi-Lakos | 307/87 X |

OTHER PUBLICATIONS

"Large Adjustable Speed Fan Drives Including Static Converter Developments for Cement Plants", J. R. Eliason, B. S. Fisher, IEEE Transactions on Industry Applications, vol. IA-13, No. 6, Nov./Dec. 1977, pp. 557–562.

Primary Examiner—J. V. Truhe
Assistant Examiner—Richard M. Moose
Attorney, Agent, or Firm—Wenderoth, Lind & Ponack

[57] ABSTRACT

A frequency detector produces a pulse train from an emf generated across a three-phase induction motor in the decelerating mode with its pulse repetition frequency proportional to the speed of the motor. A phase locked loop synchronizes this frequency with that of a variable frequency oscillator for a variable frequency inverter and the synchronization is maintained by the phase locked loop and a ramp generator controlled with the signal from the detector. When the detected frequency equals a command frequency from a reference circuit, the inverter starts to operate the motor. When the start operation has been completed, the phase locked loop is disabled while the ramp generator is connected to the reference circuit to change the frequency of the inverter to the command frequency to complete the restart operation of the motor.

5 Claims, 7 Drawing Figures

METHOD OF RESTARTING INDUCTION MOTOR AND APPARATUS FOR CARRYING OUT THE SAME

BACKGROUND OF THE INVENTION

This invention relates to a method of restarting an induction motor in the decelerating mode by a variable frequency electric source and also to an apparatus for carrying out such a method.

There are widely utilized variable speed control systems for operating an induction motor by an associated variable frequency electric source such as an inverter, a cyclo-converter or the like. In those systems, the induction motor in the decelerating mode is required to be again supplied by the variable frequency electric source (which is hereinafter typical of an inverter) in the following cases:

(a) If a failure of commercial electric power has instantaneously occurred, the inverter is suspended at a time and then, upon the recovery of power supply, the induction motor is required to return to its original mode of operation before its stop.

(b) When it is desired to change the induction motor operated by a commercial electric source with a frequency of 50 or 60 Hz by this time to be operated at another frequency, for example, of 30 Hz, the inverter picks up the induction motor which has disconnected from the commercial electric source to coast and decelerate.

When the inverter supplies electric power to the induction motor operated in the decelerating mode, the following problems have arisen:

(1) Since a speed of the induction motor must be precisely detected in order to connect the motor to the inverter, it is necessary to use a tachometer generator for detecting the number of rotations per unit time of the induction motor. The use of the tachometer generator, however, is uneconomical and also undesirable because tachometer generators are generally less reliable than induction motor.

(2) Even though it is assumed that a tachometer generator or a pulse generator for generating pulses proportional to the number of rotations per unit time of the induction motor is used to detect a speed of the induction motor, a large-scale induction motor has a high restarting current flowing therethrough due to a low slip frequency unless the operating frequency of the inverter is precisely adjusted to the speed of the induction motor in the decelerating mode. On the other hand, upon restarting small-sized, high resistance induction motors after an instantaneous failure of electric power, one has previously employed a method of restarting the inverter at its original frequency to effect the soft-start of a voltage alone to thereby increase the number of rotations per unit time of the induction motor to its original magnitude. In large-scale low resistance induction motors, however, it is required to adjust precisely the restarting frequency of the inverter to the speed of the induction motor.

(3) Even if an attempt is made to render the restarting frequency of the inverter equal to the number of rotations per unit time of the induction motor as precisely as possible, as described above in the preceding paragraph (2), usual analog methods have errors ranging from ±0.1 to ±0.3%. In case of a negative slip error, the restarting of the inverter has resulted in the regenerative mode of operation. This has led to the necessity of forming a DC source for the inverter of a double converter which is enabled in the regenerative mode. If the DC source does not include regenerative means, then the resulting regenerative power has caused the DC overvoltage state. Therefore, it has been generally known that the restarting of induction motors should occur with a positive slip maintained.

Accordingly it is an object of the present invention to eliminate the disadvantages of the prior art practice as described above by the provision of a new and improved method of restarting an electric induction motor operated in the coasting and decelerating mode by a variable frequency electric source in such a manner that the variable frequency electric source is prevented from becoming inoperative due to an overcurrent on an overvoltage.

It is another object of the present invention to provide an apparatus for carrying out the method as described in the preceding paragraph.

SUMMARY OF THE INVENTION

The present invention provides a method of restarting an induction motor in the decelerating mode by a variable frequency electric source, comprising the steps of detecting a residual electromotive force across the induction motor, synchronizing a frequency of the variable frequency electric source with a frequency of the residual electromotive force to thereby supply electric power to the induction motor from the variable frequency electric source while the frequency of the variable frequency electric source is maintained in synchronization with a speed of the induction motor, and then changing the frequency of the variable frequency electric source to a predetermined magnitude to thereby put the induction motor in a predetermined operating state.

The present invention provides also an apparatus for restarting an induction motor in the decelerating mode by a variable frequency electric source, comprising an induction motor in the decelerating mode, a variable frequency electric source for operating the induction motor, a frequency detector for detecting a residual electromotive force across the induction motor thereby to detect a frequency thereof, a variable frequency oscillator for driving the variable frequency electric source, a synchronization control circuit for synchronizing a frequency of the variable frequency oscillator with a frequency signal from the frequency detector, and a control circuit for causing the variable frequency electric source to supply electric power to the induction motor while a frequency of an output from the variable frequency electric power source is maintained in synchronization with the speed of the induction motor by the synchronization control circuit and changing the frequency of the variable frequency electric source to a predetermined magnitude after the initiation of the power supply to thereby accelerate the induction motor to a predetermined magnitude.

For a three-phase induction motor, the frequency detector may be arranged to detect the residual electromotive force for each phase across the induction motor, and thereafter to produce two pulses for each phase in each cycle of the residual electromotive force and compose the pulses for the three phases into a pulse signal including six pulses in each cycle of the residual electromotive force; the synchronization control circuit is arranged to synchronize the frequency of the variable frequency oscillator with the pulse signal from the frequency detector.

Preferably, the frequency detector may be arranged to produce a pulse signal dependent upon a frequency of the residual electromotive force across the induction motor and the synchronization control circuit may be formed of a phase locked loop including a phase difference detector for comparing the pulse signal from the frequency detector with pulses produced by the variable frequency oscillator to produce a signal proportional to a phase difference therebetween, and an amplifier for adjusting the frequency and phase of the variable frequency oscillator so as to render the signal from the phase difference detector equal to a predetermined magnitude.

Advantageously, the control circuit may include a ramp generator circuit for changing smoothly a reference for the oscillator for the variable frequency electric source, the ramp generator circuit having a long time constant and a short time constant and including change-over means for changing one to the other of the long and short time constants, the arrangement being such that while the variable frequency electric source follows up in synchronized relationship the induction motor in the decelerating mode, the ramp generator circuit is operated with the short time constant and applied, as an input signal, with an analog signal proportional to the output from the frequency detector; after the variable frequency electric source is completed to supply the induction motor, the ramp generator circuit is operated with the long time constant and applied, as an input signal, with a reference signal for obtaining the desired speed of the induction motor.

BRIEF DESCRIPTION OF THE DRAWINGS

The present invention will become more readily apparent from the following detailed description taken in conjunction with the accompanying drawings in which.

DESCRIPTION OF THE PREFERRED EMBODIMENT

Figure 1:
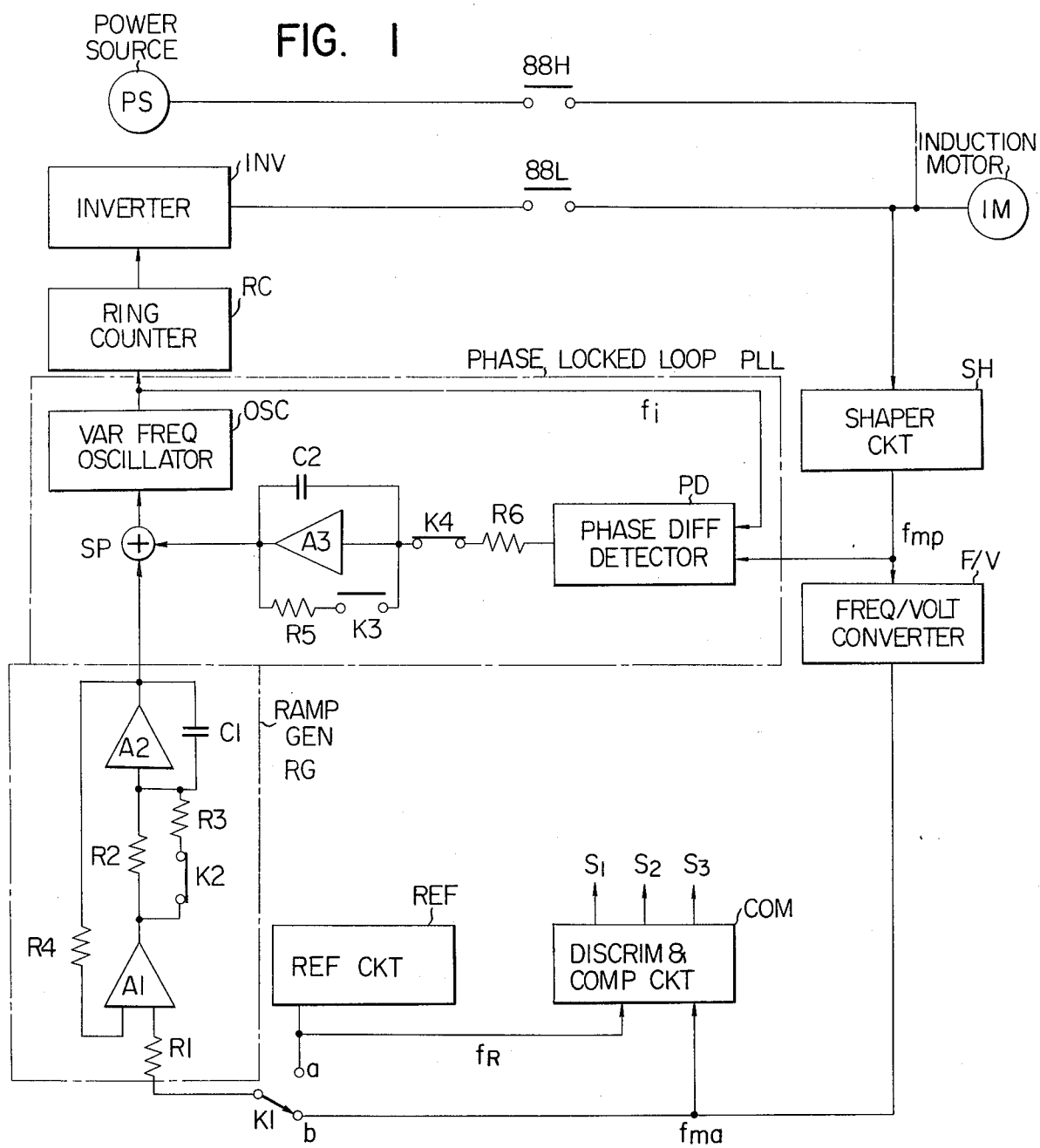
FIG. 1 is a combined block and circuit diagram of one embodiment according to the induction motor-restarting apparatus of the present invention.

Referring now to FIG. 1 of the drawings, there is illustrated one embodiment according to the induction motor-restarting apparatus of the present invention. The arrangement illustrated comprises an induction motor IM connected to a commercial source of electric power PS having a frequency of 50 Hz through a normally open contactor 88H and also to an inverter 1NV through another normally open contactor 88L. The inverter 1NV in this case is of a variable frequency type arranged to operate the induction motor IM in a frequency range of from 0 to 40 Hz.

Assuming that the induction motor IM is of the three-phase AC type and drives a blower (not shown), an air volume delivered from the blower is controlled in a low air volume region up to 80% of its rated air volume through the frequency control in a frequency range up to 40 Hz effected by the inverter 1NV with the contactors 88L and 88H put in the closed and open positions respectively. However, in a high air volume region exceeding the figure just specified, the air volume is controlled by controlling a valve operatively associated with the blower while the contactor 88L is opened and the contactor 88H is put in its closed position to operate the induction motor IM by the commercial 50 Hz power sources.

The power provided by blowers is proportional to the third power of the number of rotations per unit time of mating induction motors. Therefore the inverter 1NV can control the number of rotations per unit time or speed of the induction motor IM with its capacity decreased. For its maximum frequency of 40 Hz, the inverter 1NV is permitted to have a capacity equal to $(40/50)^3 = 0.512$ or about 51% of the capacity required for the operation at 50 Hz. In other words, the inverter becomes low in capacity and economical while it gives the result that the required electric power can be greatly reduced as compared with the control by a valve.

In the arrangement of FIG. 1, the operation of the induction motor performed by the commercial power source PS in the high air volume region can be shifted to that performed by the inverter 1NV in the low air volume region by opening the contactor 88H to decelerate the induction motor IM to a speed corresponding to not higher than 40 Hz lying in the operating region of the inverter 1NV and at that time closing the contactor 88L to put the inverter 1NV in operation.

According to the present invention, the induction motor IM is further connected to a pulse shaper circuit SH (see FIG. 1) for detecting a residual voltage or a residual electromotive force across the induction motor IM and then a frequency thereof. Thus the pulse shaper circuit acts as a frequency detector circuit and may be of a circuit configuration such as shown schematically in FIG. 2.

Figure 2:
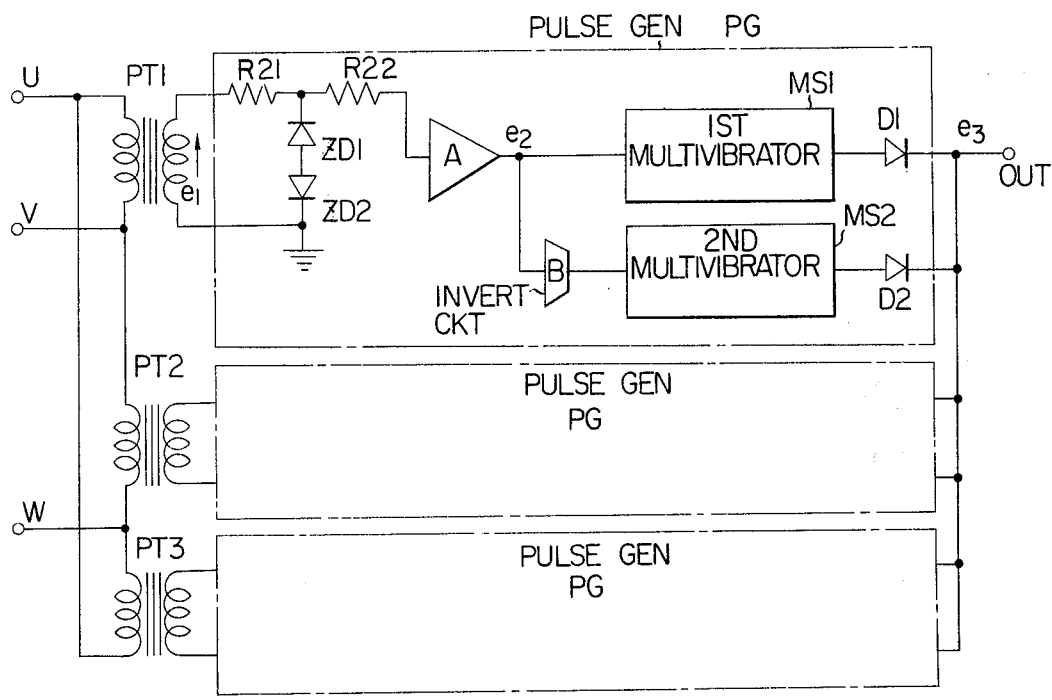
FIG. 2 is a combined block and circuit diagram of the shaper circuit for detecting a speed of an induction motor as shown in FIG. 1.

In FIG. 2, three voltages U, V and W induced across the three-phase induction motor IM are applied across the primary windings of three transformers PT1, PT2, and PT3 and induce secondary voltages across the secondary windings thereof respectively as shown typically by the secondary voltage $e_1$ induced across the secondary windings of the transformer PT1 in FIG. 2. That is, those voltages are detected by the transformers PT1, PT2 and PT3 respectively. The induction motor IM has a residual electromotive force sharply attenuated within about two seconds after the opening of the contactor 88H. Thereafter the residual electromotive force decreases in proportion to the speed of the induction motor IM until it decreases to the order of 0.1% of its initial magnitude when the speed thereof reduces to correspond to not higher than ten cycles of the residual electromotive force. Assuming that the transformer PT1 has a secondary voltage $e_1$ of 100 volts, this secondary voltage alone exists in the power running mode of operation of the induction motor IM, but is on the order of 0.1 volts in the coasting mode of operation thereof.

Figure 3:
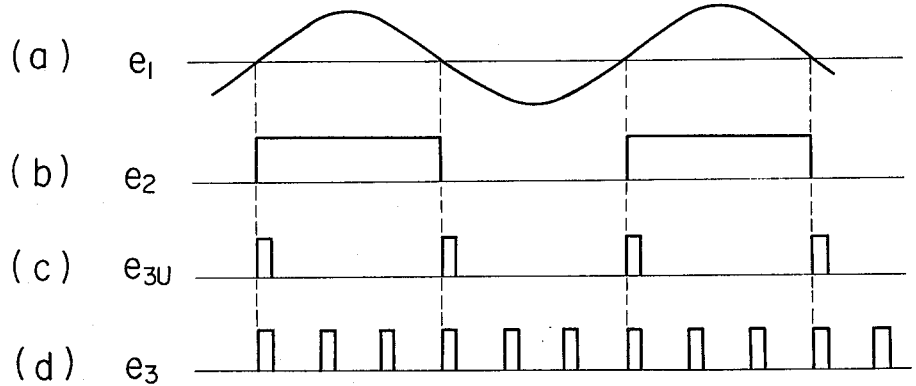
FIG. 3 is a graph illustrating waveforms developed at various points in the arrangement shown in FIG. 2.

The secondary winding of the transformer PT1 is connected via resistor R21 across a pair of Zener diodes ZD1 and ZD2 interconnected back-to-back. Therefore the amplitude of the secondary voltage $e_1$ developed in the power running mode of operation of the induction motor IM is limited by the Zener diodes ZD1 and ZD2 to have a peak-to-peak value of a few volts. The much decreased voltage $e_1$ is applied to an amplifier A through a resistor R22. That is, an input to the amplifier A is restricted. Assuming that the amplifier A has a sufficiently high gain and produces only a positive voltage portion at its output, waveforms developed at various points in the arrangement of FIG. 2 are substantially as shown in FIG. 3. More specifically, waveform (a) shows the secondary voltage $e_1$ developed across the transformer PT1 in the decelerating mode of operation of the induction motor IM and very low in amplitude. The waveform (a) is applied to an amplifier A through the resistors R21 and R22 without its amplitude limited by the Zener diodes ZD1 and ZD2. The amplifier A amplifier the voltage $e_1$ into a voltage $e_2$ having a waveform (b) shown in FIG. 3. That is, the voltage $e_2$ developed at the output of the amplifier A is formed of a pulse train including rectangular pulses, each equal in duration to the positive half cycle of the voltage $e_1$.

Then one portion of the voltage $e_2$ is applied directly to a first monostable multivibrator MS1 while the other portion thereof is inverted in polarity by an inverting circuit B and then applied to a second monostable multivibrator MS2. Outputs from both monostable multivibrators pass through respective semiconductor diodes D1 and D2 to be combined into a voltage $e_{3U}$ for the U phase in the form of a pulse train as shown at waveform (c) in FIG. 3.

From the foregoing it is seen that a pulse generator PG is formed of the components R21, R22, ZD1, ZD2, A, B, MS1, MS2, D1 and D2 to change the sinusoidal voltage $e_1$ to the pulse train $e_{3U}$ including rectangular pulses each starting at a zero crossing point of the voltage $e_1$ and therefore one pair of rectangular pulses for each cycle of the voltage $e_1$.

Each of the transformers PT2 or PT3 is connected to a pulse generator identical to that described above in conjunction with the transformer PT1 and schematically designated by dotted block PG in FIG. 2. Therefore the voltage across the induction motor TM for each of the V and W phases is processed in the same manner as the voltage for the U phase to form one pair of rectangular pulses for each cycle of the associated voltage which are developed at the output OUT to lag behind the associated pair of pulses for the U phase by phase differences of 60 or 120 degrees. Therefore a voltage $e_3$ developed at the output OUT is formed of a pulse train including six rectangular pulses for each cycle of the voltage across the induction motor IM as shown at waveform (d) in FIG. 3. As shown in FIG. 3, the voltage $e_3$ or waveform (d) includes rectangular pulses located at equal time intervals corresponding to phase differences of 60 degrees and having a pulse repetition frequency proportional to the speed of the induction motor IM.

Referring back to FIG. 1, the shaper circuit SH is connected to a frequency/voltage converter f/V. Therefore an output fmp from the shaper circuit SH or the voltage $e_3$ in the form of the pulse train is applied to a frequency/voltage converter f/V where it is converted to an analog signal fma. The analog signal fma from the frequency/voltage converter f/V is supplied to a combined discrimination and command circuit COM having applied thereto a reference signal fR from a reference circuit FFR and also to a ramp generator RG through a transfer switch K1. The switch K1 includes a pair of stationary contacts a and b connected to the reference circuit REF and the frequency/voltage converter f/V respectively.

The ramp generator RG includes an input resistor R1 connecting a movable arm of the transfer switch K1 to one input to an amplifier A1 whose output is connected to an amplifier A2 through a resistor R2. The resistor R2 is connected across a series combination of a resistor R3 and a switch K2 shown as being in its closed position. The amplifier A2 includes an output fed back to its input through a capacitor C1 and also to the other input to the input amplifier A1 through a resistor R4.

The output of the amplifier A2 is further connected through a summation point SP to a variable frequency oscillator OSC which is, in turn, connected to the inverter 1NV through a ring counter RC. In this case, the ring counter RC acts as a six step counter because the inverter 1NV is in the form of a three phase bridge to drive the three-phase induction motor IM.

The ramp generator RG can selectively generate a pair of ramp functions having different slopes. When the switch K2 is in its closed position as shown in FIG. 1, the resistor R3 with a low resistance is connected across the resistor R2 and those parallel resistors determine a small time constant with the capacitor C1. On the other hand, when the switch K2 is in its open position, the resistor R2 and the capacitor C1 determine a large time constant. Therefore by putting the switch K2 in its open or closed position, the ramp function generated by the ramp generator RG has a slope as determined by the resistor R2 and the capacitor C1 or by the resistors R2 and R3 and the capacitor C1.

The reference signal fR from the reference circuit REF indicates a command frequency at which the inverter 1NV is to be operated. With the reference or command frequency signal fR suddenly changed, the ramp generator RG supplies to the variable frequency oscillator OSC that ramp function whose amplitude smoothly varies as determined by the resistor R2 and the capacitor C1.

When the contact b of the switch K1 is closed to cause the frequency/voltage converter f/V to supply the analog signal fma to the ramp generator RG, the output from the latter changes so as to follow the deceleration of the induction motor IM. In order to reduce a delay with which this followup is effected, the switch K2 can be put in its closed position. Under these circumstances, the resitor R3 with the low resistance is connected across the resistor R2 as described above whereby the following of the ramp generator RG is effected with a sufficiently small delay. This results in a pulse repetition frequency of the variable frequency oscillator OSC changing so as to follow the deceleration of the induction motor IM. If the latter following can be effected with a high accuracy then one may adopt the method of using the combined discrimination and command circuit COM to detect a time point where the analog signal fma is equal to the reference signal fR and start the inverter 1NV at the detected time point. However, the variable frequency oscillator OSC is actually permitted only to follow the decelerating induction motor IM with an accuracy on the order of 1%.

In order to eliminate this error, the present invention includes a synchronization control circuit. In the example illustrated, a phase locked loop PLL is connected between the outputs of the shaper circuit SH and the ramp generator RG as shown in FIG. 1. The phase locked loop PLL includes the variable frequency oscillator OSC and an amplifier A3. The output of the amplifier A3 is conneced to both the input of the oscillator OSC and the output of the ramp generator RG through the summation point SP and fed back to its input through a capacitor C2 and a series combination of a resistor R5 and a switch K3 shown as being in its open position. The input to the amplifier A3 is connected to an output of a phase difference detector PD through a normally closed switch K4 and a resistor R6 serially interconnected. The phase difference detector PD includes one for receiving a train of rectangular pulse fi from the oscillator OSC and another input for receiving the pulse train fmp from the shaper circuit SH as described above.

As described above, the ring counter RC is of the six step type and the shaper circuit SH is aranged to produce six pulses for each cycle of the voltage across the induction motor IM and therefore, when the speed of the induction motor IM is synchronized with the frequency of the inverter 1NV, the pulses from the shaper circuit SH are the same in pulse repetition frequency as the output pulses fi from the oscillator OSC. In order to ensure this synchronization, the phase difference detector PD receives the both pulses fi and fmp to produce a signal proportional to the phase difference therebetween and the amplifier A3 is operative to finely adjust the frequency and phase of the the oscillator so as to render the signal from the phase difference detector PD equal to zero.

Figure 5A:
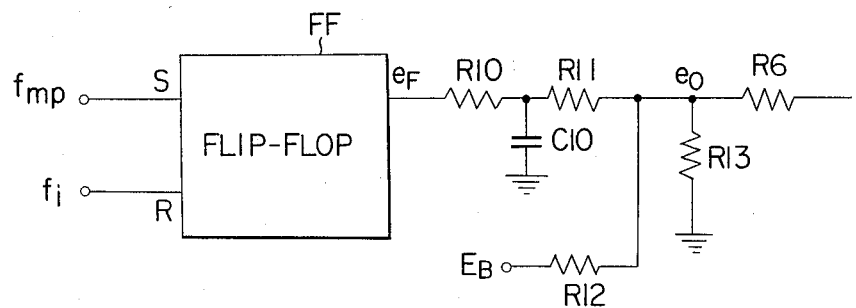
FIG. 5A is a circuit diagram of the details of the phase difference detector shown in FIG. 1.
Figure 5B:
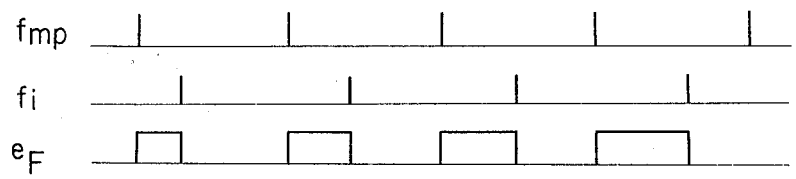
FIGS. 5B and 5C are graphs useful in explaining the operation of the arrangement shown in FIG. 5A.

While the phase difference detector PD may have several different circuit configurations, it may, by way of example, correspond to the circuit configuration shown in FIG. 5A. The illustrated arrangement comprises a flip-flop circuit FF including a set input S and a reset input R and an output. The set input S is supplied with the pulses fmp from the shaper circuit SH indicating the speed of the induction motor IM while the reset input R is supplied with the pulses fi from the oscillator OSC serving as input pulses to the ring counter RC. Therefore, the flip-flop circuit FF produces at the output rectangular pulses $e_F$ having a duration equal to the phase difference between each pulse fmp and the pulse fi following the latter. In FIG. 5B, waveform fmp describes the pulses fmp and waveform fi depicts the pulses fi. As shown also at waveform F in FIG. 5B, each of the pulses $e_F$ starts with each of the pulses fmp and terminates at that pulse fi following the latter.

The pulses $e_F$ is supplied to the resistor R6 through a filter circuit for removing ripples of the pulses $e_F$. The filter circuit includes a resistor R10 connected to the output of the flip-flop circuit FF and also to ground through a capacitor C10. The junction of the resistor R10 and the capacitor C10 is connected to a resistor R11 subsequently connected to the resistor R6. Also the junction of the resistors R11 and R6 is connected to a negative source $E_B$ through a resistor R12 for the purpose as will be apparent later and further to ground through a resistor R13.

After having passed through the filter circuit, the pulses $e_F$ forms a DC signal $e_0$ free from ripples.

Figure 5C:
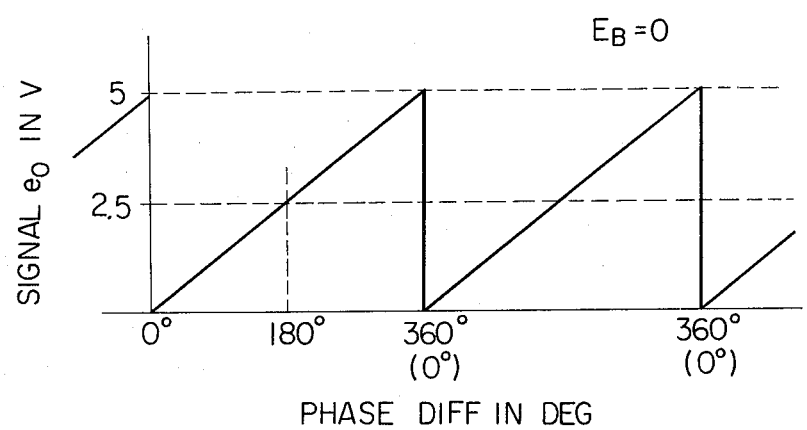

It is now assumed that the output pulse $e_F$ from the flip-flop circuit FF has an amplitude of 10 volts and that a phase difference between each pair of associated pulses fmp and fi is of 180 degrees. Under the assumed conditions, the pulse $e_F$ has a duty cycle of 50% and therefore the pulses $e_F$ average 5 volts. Also assuming that the filter circuit imparts an attenuation of 50% to a DC component while the phase difference of 180 degrees is maintained, the signal $e_0$ is of 2.5 volts. Since the signal $e_0$ is linearly changed in proportion to the phase difference between the associated pulses, the same is in the form of a periodic function including a discontinuity at a phase difference of zero or 360 degrees as shown in FIG. 5C wherein a magnitude of the signal $e_0$ is plotted in the ordinate against a phase difference in degrees in the abscissa. That is, the resulting detected signal is discontinuous. Under these circumstances, an associated control system or the phase locked loop PLL can not be operated skillfully. In order to avoid this objection, there is provided means for effecting the synchronization at a phase difference of 180 degrees. To this end, the negative source $E_B$ supplies a signal corresponding to $-2.5$ volts, equal to one half the maximum magnitude of the signal $e_0$, to the junction of the resistors R11 and R6 through the resistor R13 as shown in FIG. 5B. That is, a bias of $-2.5$ volts is applied to the signal $e_0$ (see FIG. 5C) to cause the signal $e_0$ to be at a null volt with the phase difference of 180 degrees. Under these circumstances, the phase locked loop PLL is operated to cause the signal $e_0$ to have a null magnitude so that the oscillator OSC is synchronized in frequency with the shaper circuit SH so as to maintain the phase difference of 180 degree between the mating pulses fmp and fi.

Figure 4:
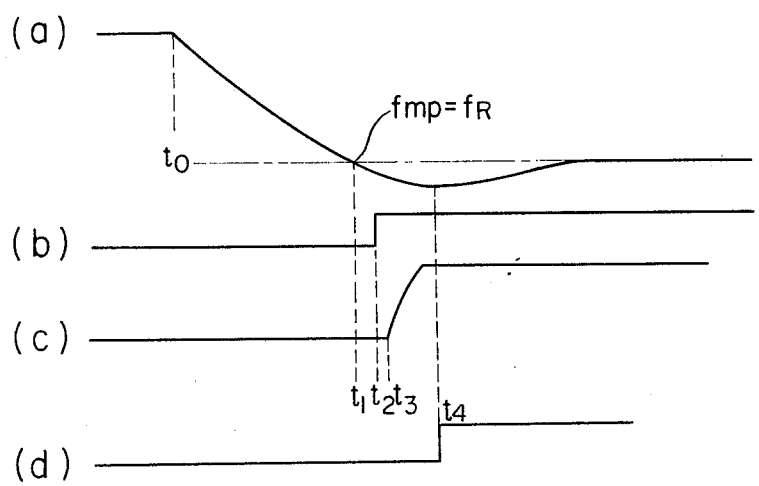
FIG. 4 is a graph useful in explaining the operation of the arrangement shown in FIG. 1.

The operation of the arrangement shown in FIG. 1 will now be described with reference to FIG. 4. First the contactor 88H is put in its open position at time point $t_0$ as shown in FIG. 4 to enter the induction motor IM into the deceleration mode of operation. It is assumed that at and after time point $t_0$ the switch K3 is maintained in its open position, the transfer switch K1 has the movable arm engaging the stationary contact b and the switch K2 is maintained in its closed position. The oscillator OSC follows the pulse train fmp from the shaper circuit as shown at waveform (a) in FIG. 4 to decrease in frequency. At time point $t_1$ the combined discrimination and command circuit COM determines that the fma is equal to the fR. Then at time point $t_2$ the contactor 88L is brought into its closed position as shown at waveform (b) in FIG. 4 to soft-start the inverter 1NV. This results in the inverter 1NV restarting in the synchronized state maintained by the phase lock circuit PLL. While about 0.3 second elapses between time points $t_1$ and $t_4$ the induction motor IM is still decelerating.

Therefore at time point $t_4$ where the soft-starting has been completed, the phase locked loop PLL is disabled as shown at waveform (d) in FIG. 4 and the input to the ramp generator RG is taken over by the reference circuit REF. To this end, the switch K4 is opened while the switch K3 is closed to permit an output from the amplifier A3 to decay slowly as determined by a time constant due to the capacitor C2 and the resistor R5. Also the switch K2 is put in its open position to slow the response of the ramp generator RG after which the switch K1 is thrown to the stationary contact a. Under these circumstances, the inverter 1NV is smoothly shifted from its frequency synchronized with the fma to the command frequency fR delivered from the reference circuit REF.

The switching sequence as described above is executed for a time interval of from time point $t_0$ to time point $t_4$ under the control of the combined discrimination and command circuit COM. More specifically, the circuit COM determines that the fma becomes equal to the fR at time point $t_1$ and generates successively command signals $S_1$, $S_2$ and $S_3$. The command signal $S_1$ is applied to the contactor 88L to bring it into its closed position at time point $t_2$ and the command signal $S_2$ is applied to the inverter 1NV to start it at time point $t_3$. Finally the command signal $S_3$ is applied to the switches K1 through K4 at time point $t_4$ so that the switches K4 and K1 are opened and closed respectively while the switch K3 is opened followed by the throwing of the switch K1 toward its stationary contact a.

From the foregoing it will readily be understood that the present invention has the following characteristic features:

(a) The speed of the induction motor can be detected without the provision of a tachometer generator;

(b) The induction motor is restarted while the frequency of the inverter is maintained in complete synchronization with the speed of the induction motor. This prevents any high current from flowing through the induction motor which is particularly important with large-size low resistance induction motors.

(c) There is no fear that the restart occurs with a negative slip and therefore no regenerative mode of operation is entered. This means that the present invention is equally applicable to electric sources without regenerative means.

(d) Since the induction motor is always in the synchronized state in the decelerating mode, the same can be restarted at any desired time point and with any desired number of rotation per unit time thereof.

(e) No hindrance results from the deceleration of the induction motor occurring for a time interval of from 0.1 to 0.5 second starting with the discrimination that the induction motor has decelerated to the desired speed thereof and terminating at the completion of generation of a voltage from the inverter.

(f) In not only systems for changing from the operation with the commercial electric source to the operation with the inverter and vice versa such as shown in FIG. 1 but also inverters for general purposes, there is in many cases the necessity of providing the so-called countermeasure to the failure of electric power supply such as a measure of restarting to the original operating state upon recovering power supply. Applicable to this case is the greater part of the arrangement as shown in FIG. 1 while keeping it intact. More specifically, upon recovering power supply after its failure, the synchronization is accomplished by the phase locked loop PLL while the switches K1 through K4 are held in their positions illustrated. Then, after the synchronization of the phase locked loop PLL has been confirmed on the basis of the output from the phase difference detector PD, the inverter 1NV is started and the switches K1 through K4 are put in their positions reversed from those illustrated. Thereby the induction motor IM can be accelerated to its original operating state.

From the foregoing it is seen that the present invention can prevent the occurrence of an overcurrent or an overvoltage upon restarting the induction motor at any time point because the frequency of the variable frequency oscillator always follows and is synchronized with the speed of the induction motor in the decelerating mode by detecting a residual electromotive force across the induction motor in the decelerating mode, and synchronizing a frequency of the variable frequency oscillator with a frequency of the residual electromotive force after which the variable frequency oscillator supplies electric power to the induction motor.

While the present invention has been illustrated and described in conjunction with a single preferred embodiment thereof it is to be understood that numerous changes and modifications may be resorted to without departing from the spirit and scope of the present invention. For example, the present invention is equally applicable to any desired variable frequency electric source other than an inverter, for example any cycloconverter.

What is claimed is:

1. A method of restarting an induction motor in the decelerating mode by a variable frequency electric source, comprising the steps of detecting a residual electromotive force across said induction motor, synchronizing the frequency of said variable frequency electric source with the frequency of said residual electromotive force to thereby supply electric power to said induction motor from said variable frequency source while maintaining the frequency of said variable frequency electric source in synchronism with the speed of said induction motor, and then changing said frequency of said variable frequency electric source to a predetermined value to thereby place said induction motor in a predetermined operating state.

2. An apparatus for restarting an induction motor in the decelerating mode by a variable frequency electric source, comprising a variable frequency electric source for powering said induction motor, a frequency detector for detecting a residual electromotive force across said induction motor and for detecting the frequency thereof, a variable frequency oscillator for driving said variable frequency electric source, a synchronization control circuit for synchronizing the frequency of said variable frequency oscillator with a frequency signal from said frequency detector, and a control circuit for causing said variable frequency electric source to supply electric power to said induction motor while the frequency of the output from said variable frequency electric source is maintained in synchronism with the speed of said induction motor by said synchronization control circuit, and for changing said frequency of said variable frequency electric source to a predetermined value after the initiation of said supplying of power to thereby accelerate said induction motor to a predetermined speed.

3. An apparatus for restarting an induction motor as claimed in claim 2, wherein said induction motor is of a three-phase type and wherein said frequency detector is arranged to detect said residual electromotive force for each phase of said induction motor, and to produce two pulses for each phase in each cycle of the residual electromotive force and to combine said pulses for the three-phases into a pulse signal including six pulses in each cycle of the residual electromotive force while said synchronization control circuit is arranged to synchronize said frequency of said variable frequency oscillator with said pulse signal from said frequency detector.

4. An apparatus for restarting an induction motor as claimed in claim 2, wherein said frequency detector is arranged to produce a pulse signal dependent upon said frequency of said residual electromotive force across said induction motor, and said synchronization motor control circuit comprises a phase locked loop including a phase difference detector for comparing a pulse signal from said frequency detector with pulses produced by said variable frequency oscillator to produce a signal proportional to a phase difference therebetween, and an amplifier for adjusting the frequency and phase of said variable frequency oscillator, wherein said signal from said phase difference detector is equal to a predetermined magnitude.

5. An apparatus for restarting an induction motor as claimed in claim 2, wherein said control circuit includes a ramp generator circuit for smoothly changing a reference supply for said oscillator driving said variable frequency electric source, said ramp generator circuit having a long time constant and a short time constant and including change-over means for switching between said long and short time constants, wherein when the frequency of said variable frequency electric source is synchronized with the speed of said induction motor in the decelerating mode, then said ramp generator circuit is operated with said short time constant and applied as an input signal in conjunction with an analog signal proportional to the output from said frequency detctor, and after said variable frequency electric source has completed the supplying of power to said induction motor, said ramp generator circuit is operated with said long time constant and applied as an input signal in conjunction with a reference signal for a desired operating mode of said induction motor.

* * * * *